(12) United States Patent
Frenne et al.

(10) Patent No.: US 8,982,814 B2
(45) Date of Patent: Mar. 17, 2015

(54) NETWORK NODE, USER EQUIPMENT AND METHODS THEREIN

(75) Inventors: Mattias Frenne, Uppsala (SE);
Christian Hoymann, Aachen (DE);
Johan Furuskog, Bromma (SE); Daniel Larsson, Solna (SE); Jung-Fu Cheng, Fremont, CA (US); Havish Koorapaty, Saratoga, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 438 days.

(21) Appl. No.: 13/393,026

(22) PCT Filed: Jan. 27, 2012

(86) PCT No.: PCT/SE2012/050081
§ 371 (c)(1),
(2), (4) Date: Feb. 28, 2012

(87) PCT Pub. No.: WO2013/066231
PCT Pub. Date: May 10, 2013

(65) Prior Publication Data
US 2013/0114521 A1 May 9, 2013

Related U.S. Application Data

(60) Provisional application No. 61/555,555, filed on Nov. 4, 2011.

(51) Int. Cl.
H04W 4/00 (2009.01)
H04L 5/00 (2006.01)

(52) U.S. Cl.
CPC ............. *H04L 5/0053* (2013.01); *H04L 5/0048* (2013.01)
USPC ........................................................ 370/329

(58) Field of Classification Search
USPC .......................................... 370/328, 329, 330
See application file for complete search history.

(56) References Cited

U.S. PATENT DOCUMENTS

| 8,537,862 | B2* | 9/2013 | Blankenship et al. ........ 370/483 |
| 2011/0249633 | A1 | 10/2011 | Hong |
| 2013/0039284 | A1* | 2/2013 | Marinier et al. .............. 370/329 |
| 2013/0044834 | A1 | 2/2013 | Koorapaty et al. |

FOREIGN PATENT DOCUMENTS

EP 2 355 604 A1 8/2011

OTHER PUBLICATIONS

International Search Report, PCT Application No. PCT/SE2012/050081, Jul. 11, 2012.
Written Opinion of the International Searching Authority, PCT Application No. PCT/SE2012/050081, Jul. 11, 2012.
Samsung: "Discussion on ePDCCH Design Issues", 3GPP Draft; R1-112517 EPDCCH, 3rd Generation Partnership Project (3GPP), Mobile Competence Centre; 650 Route Des Lucioles; F-06921 Sophia-Antipolis Cedex; France, vol. RAN WG1, no. Athens, Greece; Aug. 22, 2011, Aug. 16, 2011 XP050537597.

* cited by examiner

*Primary Examiner* — Mohammad Anwar
(74) *Attorney, Agent, or Firm* — Myers Bigel Sibley & Sajovec, P.A.

(57) ABSTRACT

A method in a network node for transmitting an enhanced Control CHannel, eCCH, to a user equipment in a telecommunications system. The eCCH comprises control information to the user equipment in at least one Control Channel Element, CCE. The at least one CCE maps to a number of resource elements comprised in at least one enhanced resource element group. The at least one enhanced resource element group is comprised in at least one resource block in a time-frequency Orthogonal Frequency Division Multiplexing, OFDM, grid. The network node decides to use a CCE aggregation level that is smaller than the smallest CCE aggregation level of a physical downlink control channel, PDCCH, for a first eCCH. The network node then modulates the first eCCH by using a higher order modulation than Quadrature Phase Shift Keying, QPSK, modulation, when the smaller CCE aggregation level is used for the first eCCH. Then, the network node maps the modulated first eCCH to the at least one enhanced resource element group of resource elements in the at least one resource block, and transmits the mapped first eCCH to the user equipment. A network node, a method in user equipment and a user equipment are also provided.

26 Claims, 11 Drawing Sheets

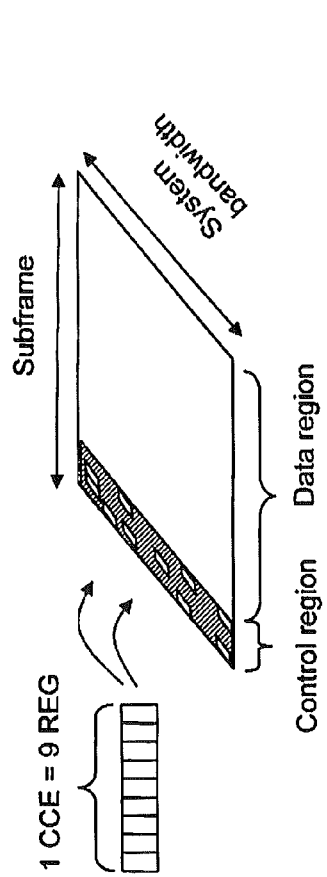
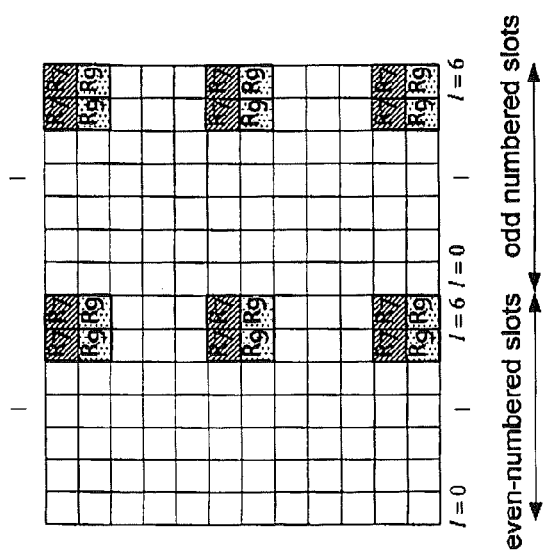

NETWORK NODE, USER EQUIPMENT AND METHODS THEREIN

CROSS REFERENCE TO RELATED APPLICATIONS

This application is a 35 U.S.C. §371 national stage application of PCT International Application No. PCT/SE2012/050081, filed on 27 Jan. 2012, which itself claims priority to U.S. provisional Patent Application No. 61/555,555, filed 4 Nov. 2011, the disclosures and content of both of which are incorporated by reference herein in their entirety.

TECHNICAL FIELD

Embodiments herein relate to a network node, a user equipment and methods therein. In particular, embodiments herein relate to transmitting and handling enhanced Control CHannels (eCCH) in a telecommunications system.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for radio communication. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

Long Term Evolution (LTE) is a project within the 3rd Generation Partnership Project (3GPP) to evolve the WCDMA standard towards the fourth generation (4G) of mobile telecommunication networks. In comparisons with third generation (3G) WCDMA, LTE provides increased capacity, much higher data peak rates and significantly improved latency numbers. For example, the LTE specifications support downlink data peak rates up to 300 Mbps, uplink data peak rates of up to 75 Mbit/s and radio access network round-trip times of less than 10 ms. In addition, LTE supports scalable carrier bandwidths from 20 MHz down to 1.4 MHz and supports both Frequency Division Duplex (FDD) and Time Division Duplex (TDD) operation.

LTE technology is a mobile broadband wireless communication technology in which transmissions are sent using orthogonal frequency division multiplexing (OFDM), wherein the transmissions are sent from base stations, also referred to herein as network nodes or eNBs, to mobile stations, also referred to herein as user equipments or UEs. The transmission OFDM splits the signal into multiple parallel sub-carriers in frequency.

The basic unit of transmission in LTE is a resource block (RB) which in its most common configuration comprises of 12 subcarriers and 7 OFDM symbols in one time slot. A unit of one subcarrier and 1 OFDM symbol is referred to as a resource element (RE), as shown in FIG. 1. Thus, an RB comprises 84 REs.

Accordingly, a basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies for subcarriers having a subcarrier spacing $\Delta f$ are defined along an z-axis and symbols are defined along an x-axis.

In the time domain, LTE downlink transmissions are organized into radio frames of 10 ms, each radio frame comprising ten equally-sized sub-frames, #0-#9, each with a $T_{sub-frame}=1$ ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. Resource blocks are numbered in the frequency domain, starting with resource block 0 from one end of the system bandwidth.

An LTE radio sub-frame is composed of multiple RBs in frequency with the number of RBs determining the bandwidth of the system and two slots in time, as shown in FIG. 3. Furthermore, the two RBs in a sub-frame that are adjacent in time are denoted as an RB pair.

The signal transmitted by the network node in a downlink, that is, the link carrying transmissions from the network node to the user equipment, sub-frame may be transmitted from multiple antennas and the signal may be received at a user equipment that has multiple antennas. The radio channel distorts the transmitted signals from the multiple antenna ports. In order to demodulate any transmissions on the downlink, a user equipment relies on reference signals (RS) that are transmitted on the downlink. These reference signals (RS) and their position in the time-frequency grid are known to the user equipment and hence may be used to determine channel estimates by measuring the effect of the radio channel on these signals.

It should be noted in this context that the channel an user equipment measures is not necessarily from a particular physical transmit antenna element at the network node to the user equipments receiver antenna element, since the user equipment base the measurement on a transmitted RS and the channel it measures depends on how the particular RS is transmitted from the multiple physical antenna elements at the network node. Therefore, the concept of an antenna port is introduced, where an antenna port is a virtual antenna that is associated with an RS.

Hence, a user equipment measures the channel from an antenna port to the receiver antenna element using the RS associated with that antenna port but which or which group of physical transmit antenna elements that are actually used for the transmission of this RS is transparent and also irrelevant for the user equipment; the transmission on an antenna port may use a single physical antenna element or a combination of signals from multiple antenna elements. Hence, in the effective channel that the user equipment measures from the antenna port, the used precoding or mapping to physical antenna elements is transparently included.

An example of utilization of multiple antenna elements is the use of transmit precoding to direct the transmitted energy towards one particular receiving user equipment, by using all available antenna elements for transmission to transmit the same message, but where individual phase and possibly amplitude weights are applied at each transmit antenna element. This is sometimes denoted UE-specific precoding and the RS in this case is denoted UE-specific RS. If the transmitted data in the RB is pre-coded with the same UE-specific precoding as the data, then the transmission is performed using a single virtual antenna, i.e. a single antenna port, and the user equipment need only to perform channel estimation using this single UE-specific RS and use it as a reference for demodulating the data in this RB.

The UE-specific RS are transmitted only when data is transmitted to a user equipment in the sub-frame otherwise they are not present. In LTE, UE-specific RS are included as part of the RBs that are allocated to a user equipment for reception of user data.

FIG. 4 shows examples of UE-specific reference signals in LTE, where for example all RE denoted $R_7$ belong to one "RS", hence what is known as an RS is a collection of distributed REs comprising reference symbols.

Another type of reference signals are those that may be used by all user equipments and thus have wide cell area coverage. One example of these is the common reference signals (CRS) that are used by user equipments for various purposes including channel estimation and mobility measurements. These CRS are defined so that they occupy certain pre-defined REs within all the sub-frames in the system bandwidth irrespectively of whether there is any data being sent to users in a sub-frame or not. In FIG. 3, these CRS are shown as "reference signals" or "reference signals comprising a set of reference symbols".

Messages transmitted over the radio link to users may be broadly classified as control messages or data messages. Control messages are used to facilitate the proper operation of the system as well as proper operation of each user equipment within the system. Control messages could include commands to control functions such as the transmitted power from a user equipment, signalling of RBs within which the data is to be received by the user equipment or transmitted from the user equipment and so on. Examples of control messages are the physical downlink control channel (PDCCH) which for example carry scheduling information and power control messages, the physical HARQ indicator channel (PHICH), which carries ACK/NACK in response to a previous uplink transmission and the physical broadcast channel (PBCH) which carries system information.

In LTE Release 10, control messages are demodulated using the CRS, except for the R-PDCCH as is seen below, hence they have a wide cell coverage to reach all user equipments in the cell without having knowledge about their position. The first one to four OFDM symbols, depending on the configuration, in a sub-frame are reserved for control information, as shown in FIG. 3. Control messages could be categorized into those types of messages that need to be sent only to one user equipment, that is, UE-specific control, and those that need to be sent to all user equipments or some subset of user equipments numbering more than one, that is, common control, within the cell being covered by the network node.

It shall be noted in this context that in future LTE releases, there will be new carrier types which may not have a PDCCH transmission or transmission of CRS.

PDCCH Processing

Control messages of PDCCH type are transmitted in multiples of units called Control Channel Elements (CCEs) where each CCE maps to 36 REs. A PDCCH may have aggregation level (AL) of 1, 2, 4 or 8 CCEs to allow for link adaptation of the control message. Furthermore, each CCE is mapped to 9 resource element groups (REG) comprising 4 RE each. These REG are distributed over the whole bandwidth to provide frequency diversity for a CCE. Hence, the PDCCH, which comprises up to 8 CCEs spans the entire system bandwidth in the first n={1, 2, 3 or 4} OFDM symbols, depending on the configuration.

In FIG. 5, one CCE belonging to a PDCCH is mapped to the control region which spans the whole system bandwidth.

After channel coding, scrambling, modulation and interleaving of the control information the modulated symbols are mapped to the resource elements in the control region. In total there are $N_{CCE}$ CCEs available for all the PDCCH to be transmitted in the sub-frame and the number $N_{CCE}$ varies from sub-frame to sub-frame depending on the number of control symbols n.

As $N_{CCE}$ varies from sub-frame to sub-frame, the terminal needs to blindly determine the position and the number of CCEs used for its PDCCH which may be a computationally intensive decoding task. Therefore, some restrictions in the number of possible blind decodings a terminal needs to go through have been introduced. For instance, the CCEs are numbered and CCE aggregation levels of size K may only start on CCE numbers evenly divisible by K, as shown in FIG. 6.

FIG. 6 shows a CCE aggregation illustrating aggregation levels (AL) 8, 4, 2 and 1. The set of CCE where a terminal needs to blindly decode and search for a valid PDCCH are called search spaces. This is the set of CCEs on a AL a terminal should monitor for scheduling assignments or other control information, for example, as shown in FIG. 7.

FIG. 7 shows an exemplifying sketch showing the search space a certain terminal needs to monitor. In total there are $N_{CCE}$=15 CCEs in this example and the common search space is marked with striped lines.

In each sub-frame and on each AL, a terminal will attempt to decode all the PDCCHs that may be formed from the CCEs in its search space. If the CRC checks, that is, if the CRC is correct, then the content of the PDCCH is assumed to be valid for the terminal and it further processes the received information. Often will two or more terminals have overlapping search spaces and the network has to select one of them for scheduling of the control channel. When this happens, the non-scheduled terminal is said to be blocked. The search spaces vary pseudo-randomly from sub-frame to sub-frame to minimize this blocking probability.

A search space is further divided to a common and a terminal specific part. In the common search space, the PDCCH comprising information to all or a group of terminals is transmitted, that is, for example, paging, system information. If carrier aggregation is used, a terminal will find the common search space present on the primary component carrier (PCC) only. The common search space is restricted to aggregation levels 4 and 8 to give sufficient channel code protection for all terminals in the cell. This is because it is a broadcast channel and link adaptation cannot be used. The $m_8$ and $m_4$ first PDCCH, with lowest CCE number, in an AL of 8 or 4, respectively, belongs to the common search space. For efficient use of the CCEs in the system, the remaining search space is terminal specific at each aggregation level.

A CCE comprises 36 QPSK modulated symbols that map to the 36 RE unique for this CCE. To maximize the diversity and interference randomization, interleaving of all the CCEs is used before a cell specific cyclic shift and mapping to REs, as shown by the processing steps in FIG. 8.

FIG. 8 shows processing steps of all the PDCCH to be transmitted in a sub-frame. Note that in most cases are some CCEs empty due to the PDCCH location restriction to terminal search spaces and aggregation levels. The empty CCEs are included in the interleaving process and mapping to RE as any other PDCCH to maintain the search space structure. Empty CCE are set to zero power and this power may instead be used by non-empty CCEs to further enhance the PDCCH transmission.

Furthermore, to enable the use of 4 antenna TX diversity, a group of 4 adjacent QPSK symbols in a CCE is mapped to 4 adjacent RE, denoted a RE group (REG). Hence, the CCE interleaving is quadruplex, that is, a group of 4, based and mapping process has a granularity of 1 REG and one CCE corresponds to 9 REGs (=36 RE).

Introducing an Enhanced Control Channel

Transmission of the physical downlink shared data channel (PDSCH) to user equipments may use REs in RB pairs that are not used for control messages or RS and may either be transmitted using the UE-specific reference symbols or the CRS as a demodulation reference, depending on the transmission mode. The use of UE-specific RS allows a multi-antenna network node to optimize the transmission using pre-coding of both data and reference signals being transmitted from the multiple antennas so that the received signal energy increase at the user equipment and consequently, the channel estimation performance is improved and the data rate of the transmission could be increased.

In LTE Release 10, a relay control channel was also defined, denoted R-PDCCH for transmitting control information from network node to relay nodes. The R-PDCCH is placed in the data region, hence, similar to a PDSCH transmission. The transmission of the R-PDCCH may either be configured to use CRS to provide wide cell coverage or relay node (RN) specific reference signals to improve the link performance towards a particular RN by precoding, similar to the PDSCH with UE-specific RS. The UE-specific RS is in the latter case used also for the R-PDCCH transmission. The R-PDCCH occupies a number of configured RB pairs in the system bandwidth and is thus frequency multiplexed with the PDSCH transmissions in the remaining RB pairs, as shown in FIG. 9.

FIG. 9 shows a downlink sub-frame showing 10 RB pairs and transmission of 3 R-PDCCH, that is, red, green or blue, of size 1 RB pair each. The R-PDCCH does not start at OFDM symbol zero to allow for a PDCCH to be transmitted in the first one to four symbols. The remaining RB pairs may be used for PDSCH transmissions.

In LTE Release 11 discussions, attention has turned to adopt the same principle of UE-specific transmission as for the PDSCH and the R-PDCCH for enhanced control channels, that is, including PDCCH, PHICH, PCFICH, PBCH, by allowing the transmission of generic control messages to a user equipment using such transmissions be based on UE-specific reference signals. This means that precoding gains may be achieved also for the control channels. Another benefit is that different RB pairs may be allocated to different cells or different transmission points within a cell, and thereby may inter-cell interference coordination between control channels be achieved. This frequency coordination is not possible with the PDCCH since the PDCCH spans the whole bandwidth.

FIG. 10 shows an ePDCCH which, similar to the CCE in the PDCCH, is divided into multiple groups and mapped to one of the enhanced control regions. That is, a downlink sub-frame showing a CCE belonging to an ePDCCH that is mapped to one of the enhanced control regions, to achieve localized transmission.

Note that, in FIG. 10, the enhanced control region does not start at OFDM symbol zero, to accommodate simultaneous transmission of a PDCCH in the sub-frame. However, as was mentioned above, there may be carrier types in future LTE releases that do not have a PDCCH, in which case the enhanced control region could start from OFDM symbol zero within the sub-frame.

Even if the enhanced control channel enables UE-specific precoding and such localized transmission, as shown in FIG. 10, it may in some cases be useful to be able to transmit an enhanced control channel in a broadcasted, wide area coverage fashion. This is useful if the network node does not have reliable information to perform precoding towards a certain user equipment, then a wide area coverage transmission is more robust, although the precoding gain is lost. Another case is when the particular control message is intended to more than one user equipment, in this case, UE-specific precoding cannot be used. An example is the transmission of the common control information using PDCCH, that is, in the common search space. In yet another case, sub-band precoding may be utilized, since the user equipment estimates the channel in each RB pair individually, the network node may choose different precoding vectors in the different RB pairs, if the network node has such information that the preferred precoding vectors is different in different parts of the frequency band.

In any of these cases a distributed transmission may be used, as shown in FIG. 11, where the eREG belonging to the same ePDCCH are distributed over the enhanced control regions.

FIG. 11 shows a downlink sub-frame showing a CCE belonging to an ePDCCH is mapped to multiple of the enhanced control regions, to achieve distributed transmission and frequency diversity or sub-band precoding.

FIG. 12 shows a downlink RB pair showing an example with 4 enhanced resource element groups (eREG) each comprising 36 RE, i.e. (42-6 RE), and 2 antenna ports (AP0, AP1). Each eREG is associated with an antenna port and each AP is associated with 2 eREG. Note that according to other examples an eREG may comprise 72 REs.

Thus, one concept for enhanced control signal transmission with UE-specific reference signals is wherein for each configured RB or RB pair used for control channel transmission, multiple orthogonal resources are defined. A resource is most generally defined as a region in the time-frequency OFDM grid comprising a subset of the RE in the RB or in the RB pair plus a cover code from a set of orthogonal cover codes. Hence, the resources are orthogonally multiplexed in time, frequency and code domain, that is, TDM, FDM and CDM, respectively. Below, without loss of generality, it is assumed that the code division is not used, instead a resource is defined as a region in the time frequency grid only.

Each of the time frequency resources is associated with a unique RS, or equivalently antenna port, which is located in the same RB or RB pair. When a user equipment demodulates the information in a given resource of the RB or RB pair, it uses the RS/antenna port associated with that resource. Furthermore, each resource in an RB or RB pair may be independently assigned to user equipments. FIG. 12 shows an example, where time and frequency division of RE into resources denoted enhanced RE groups, that is, the eREG is one resource, is used and where each eREG is associated with one RS from the set of orthogonal RS in the RB or RB pair.

Each eREG is associated with an Antenna Port (AP) and this may, for example, be described with a node diagram as shown in FIG. 13. Here, it may be seen that eREG 1 and eREG 3 are associated with antenna port (AP) 0. When a user equipment demodulates part of an ePDCCH transmitted in for example eREG1, it will use the RS associated with AP 0 for demodulation.

FIG. 13 shows the association between AP and eREG in the example shown in FIG. 12. Note that even if multiple orthogonal RS are used in the RB or RB pair, there is only one layer of control data transmitted. As is shown in FIG. 13, it is possible that more than one eREG is using one AP, which is possible since the eREG are orthogonal in the time-frequency OFDM grid. Note that in this case will both eREG1 and eREG3 use the same precoding vector since they use the same antenna port.

The use of antenna ports here shall not be confused with MIMO multiple layer transmission in an RB pair, where each of the multiple RS or AP corresponds to a transmitted MIMO layer. If this would be the case, one eREG would have multiple layers and each eREG would then need to be associated with more than one AP, one per layer. FIG. 14 shows the related node diagram for this case.

FIG. 14 shows the association between AP and eREG in the case of spatial multiplexing where eREG 1 comprises two layers, each associated with an AP.

In each resource, control information is transmitted comprising, but not limited to, an enhanced PDCCH, a CCE or a fraction of a CCE, an enhanced PHICH or an enhanced PBCH. If the resource is too small to fit a whole enhanced PDCCH, CCE, PHICH or PBCH, a fraction may be transmitted in the resource and the other fraction in other resources in other RB or RB pairs elsewhere in the same sub-frame as was shown in FIG. 11. Note that resources in other RB or RB pairs are associated with their respective antenna ports within the same RB or RB pair.

An on-going problem in telecommunications system as described above, is that the spectral efficiency of the large amounts of control information transmissions that are continuously being sent between network nodes and user equipments is not efficient enough.

SUMMARY

It is an object of embodiments herein to provide a way of improving the spectral efficiency in a telecommunications system.

According to a first aspect of embodiments herein, the object is achieved by a method in a network node for transmitting an enhanced Control CHannel, eCCH, to a user equipment in a telecommunications system. The eCCH comprises control information to the user equipment in at least one Control Channel Element, CCE. The at least one CCE maps to a number of resource elements comprised in at least one enhanced resource element group. The at least one enhanced resource element group is comprised in at least one resource block in a time-frequency Orthogonal Frequency Division Multiplexing, OFDM, grid. The network node decides to use a CCE aggregation level that is smaller than the smallest CCE aggregation level of a physical downlink control channel, PDCCH, for a first eCCH. The network node then modulates the first eCCH by using a higher order modulation than Quadrature Phase Shift Keying, QPSK, modulation, when the smaller CCE aggregation level is used for the first eCCH. Also, the network node maps the modulated first eCCH to the at least one enhanced resource element group of resource elements in the at least one resource block, and transmits the mapped first eCCH to the user equipment.

According to a second aspect of embodiments herein, the object is achieved by a network node for transmitting an enhanced control channel, eCCH, to a user equipment in a telecommunications system. The eCCH comprises control information to the user equipment in at least one Control Channel Element, CCE. The at least one CCE maps to a number of resource elements comprised in at least one enhanced resource element group. The at least one enhanced resource element group is comprised in at least one resource block in a time-frequency Orthogonal Frequency Division Multiplexing, OFDM, grid. The network node comprises a processing circuitry configured to decide to use a CCE aggregation level that is smaller than the smallest CCE aggregation level of a physical downlink control channel, PDCCH, for a first eCCH. The processing circuitry is further configured to modulate the first eCCH by using a higher order modulation than quadrature phase shift keying modulation, QPSK, when the smaller CCE aggregation level is used for the first eCCH. Also, the processing circuitry is configured to map the modulated first eCCH to the at least one enhanced resource element group of resource elements in the at least one resource block, and transmit the mapped first eCCH to the user equipment.

According to a third aspect of embodiments herein, the object is achieved by a method in a user equipment for handling an enhanced control channel, eCCH, from a network node in a telecommunications system. The eCCH comprises control information to the user equipment in at least one Control Channel Element, CCE. The at least one CCE maps to a number of resource elements comprised in at least one enhanced resource element group. The at least one enhanced resource element group is comprised in at least one resource block in a time-frequency Orthogonal Frequency Division Multiplexing, OFDM, grid. The user equipment determines whether a CCE aggregation level that is smaller than the smallest CCE aggregation level of a physical downlink control channel, PDCCH, has been used for a first eCCH or not. Also, the user equipment demodulates the first eCCH by using a higher order modulation than quadrature phase shift keying, QPSK, modulation, when the smaller CCE aggregation level has been used for the first eCCH.

According to a fourth aspect of embodiments herein, the object is achieved by a user equipment for handling an enhanced control channel, eCCH, from a network node in a telecommunications system. The eCCH comprises control information to the user equipment, in at least one Control Channel Element, CCE. The at least one CCE maps to a number of resource elements comprised in at least one enhanced resource element group. The at least one enhanced resource element group is comprised in at least one resource block in a time-frequency Orthogonal Frequency Division Multiplexing, OFDM, grid. The user equipment comprises a processing circuitry configured to determine whether a CCE aggregation level that is smaller than the smallest CCE aggregation level of a physical downlink control channel, PDCCH, has been used for a first eCCH or not. Also, the processing circuitry is configured to demodulate the first eCCH by using a higher order modulation than quadrature phase shift keying, QPSK, modulation, when the smaller CCE aggregation level has been used for the received first eCCH.

By introducing a CCE aggregation level that is smaller than the smallest CCE aggregation level of a PDCCH for an eCCH and modulating the eCCH with a higher order modulation than QPSK-modulation as described above, a lower amount of resources than what is used for a PDCCH is needed for transmitting the eCCH from the network node to the user equipment. In this way, the used code rate is also maintained at a reasonably low level. Thus, the spectral efficiency of the transmission of a eCCH may be improved beyond the 2 bits/RE achieved by using the smallest CCE aggregation level of a PDCCH, that is, AL=1, with QPSK-modulation. Hence, an improved spectral efficiency in the telecommunications system is achieved.

This may advantageously be used during favourable geometries and good channel conditions, such as, for example, during high SNR ratio for the downlink channel between the network node and the user equipment.

It is also an important advantage of the embodiments described above is that the increased spectral efficiency also may lead to an increased control channel capacity in the telecommunications system, because fewer physical resources or resource elements (REs) are needed for transmitting the eCCH from the network node to the user equipment.

BRIEF DESCRIPTION OF THE DRAWINGS

The above and other features and advantages of the embodiments will become readily apparent to those skilled in the art by the following detailed description of exemplary embodiments thereof with reference to the accompanying drawings, wherein:

FIG. 4 are schematic examples of UE-specific RS in LTE,

FIG. 5 is a schematic overview depicting control channel elements,

FIG. 6 is a schematic overview depicting aggregation levels of control channel elements, FIG. 7 is a schematic overview depicting aggregation levels of control channel elements.

DETAILED DESCRIPTION

Figure 1:
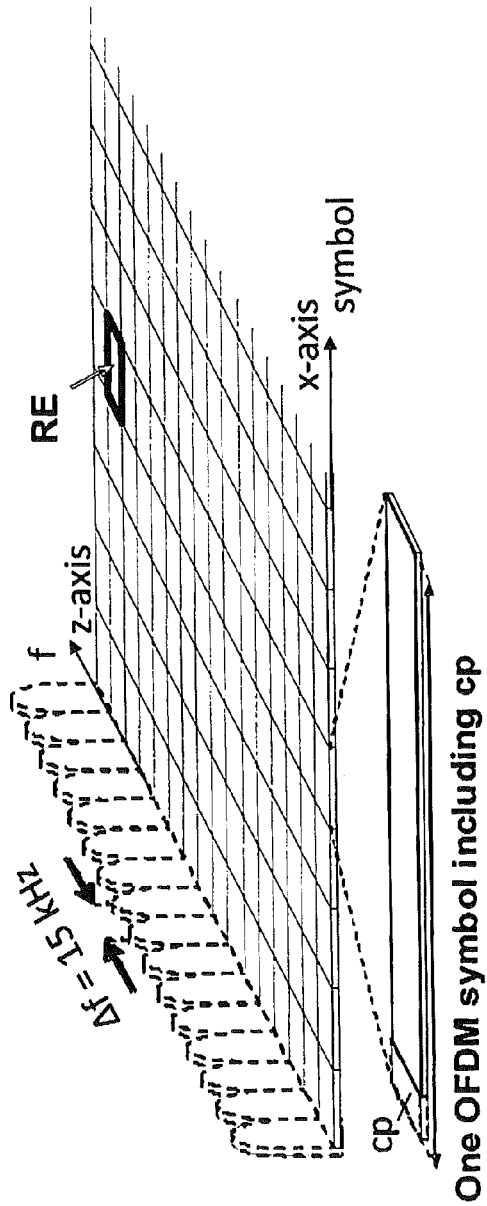
FIG. 1 is a schematic block diagram of a LTE downlink physical resource.
Figure 2:
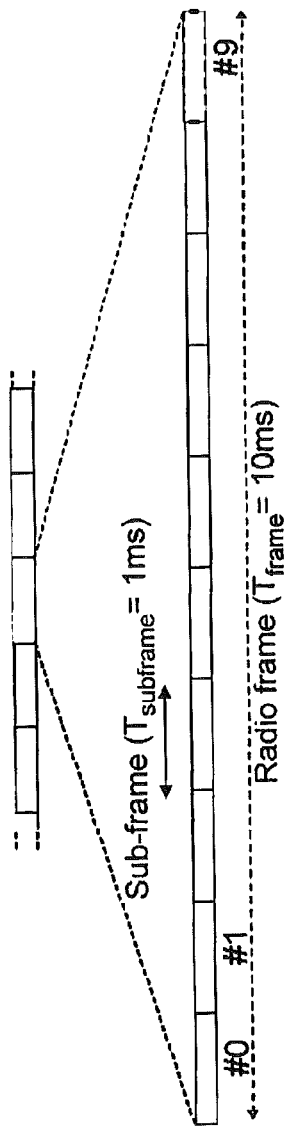
FIG. 2 is a schematic overview depicting radio frames.
Figure 3:
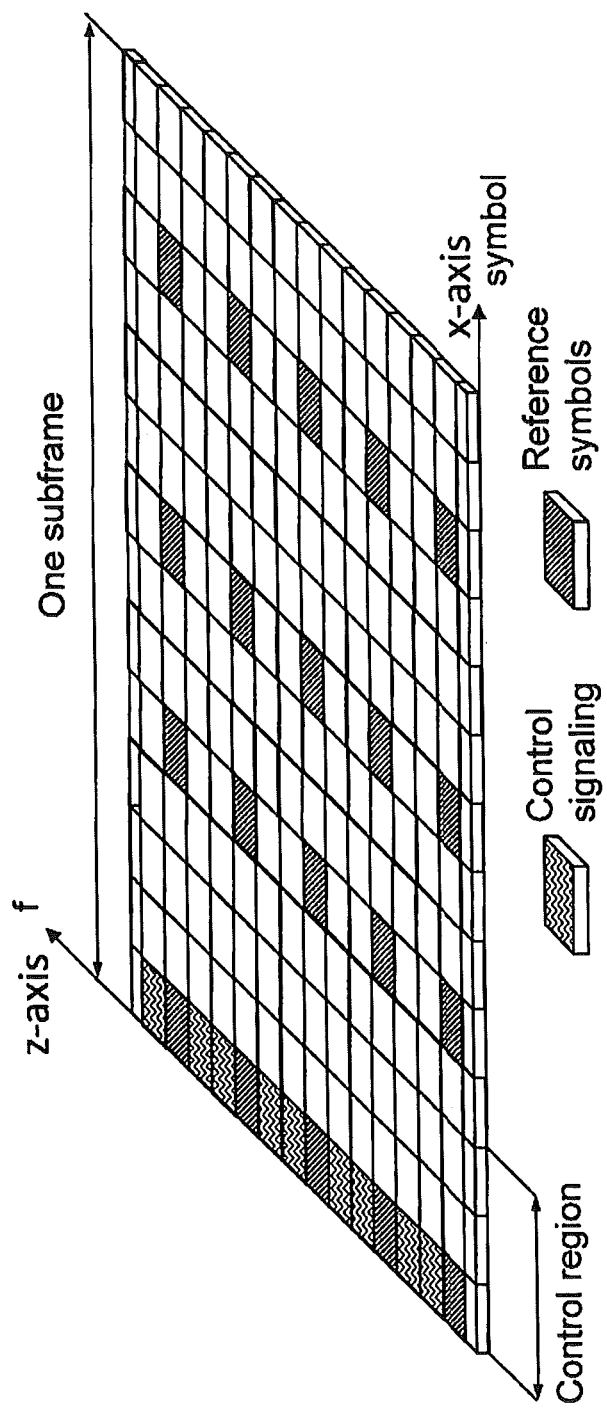
FIG. 3 is a schematic overview depicting a DL sub-frame.
Figure 9:
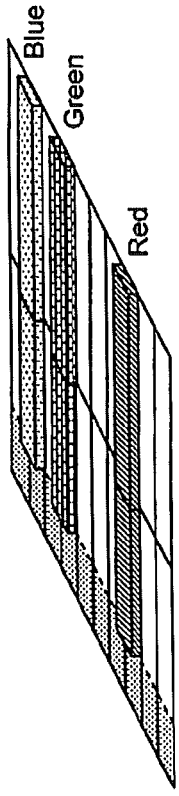
FIG. 9 is a schematic overview depicting a DL sub-frame comprising a relay control channel.
Figure 10:
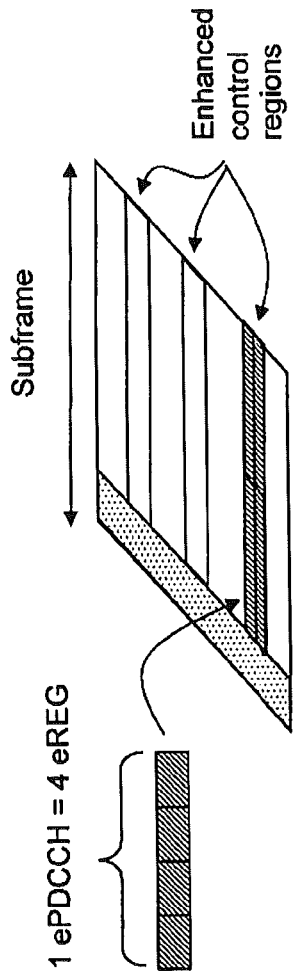
FIG. 10 is a schematic overview depicting a DL sub-frame comprising a CCE belonging to a PDCCH.
Figure 11:
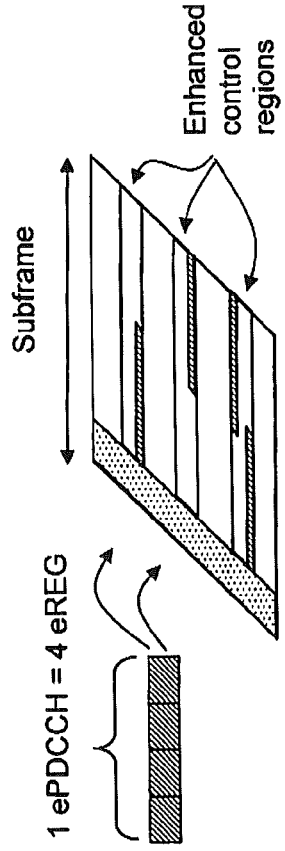
FIG. 11 is a schematic overview depicting a DL sub-frame comprising a CCE belonging to a PDCCH.
Figure 8:
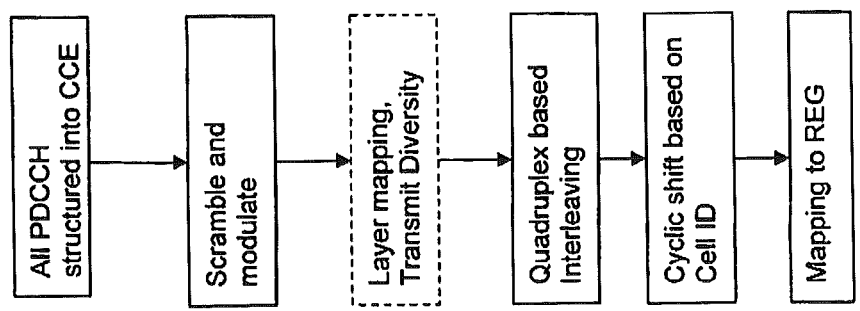
FIG. 8 is a flowchart depicting processing steps for PDCCH to be transmitted in a sub-frame.
Figure 13:
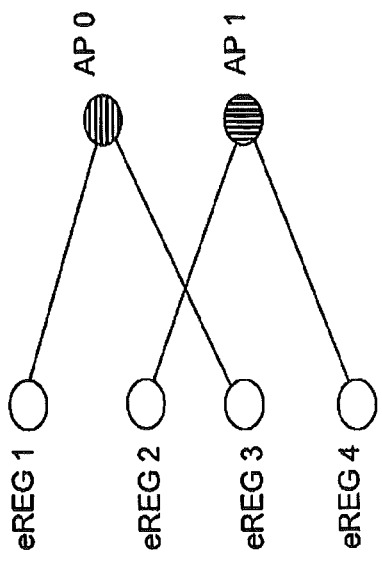
FIG. 13 is a schematic overview depicting a node diagram of associations between AP and eREGs in FIG. 12.
Figure 14:
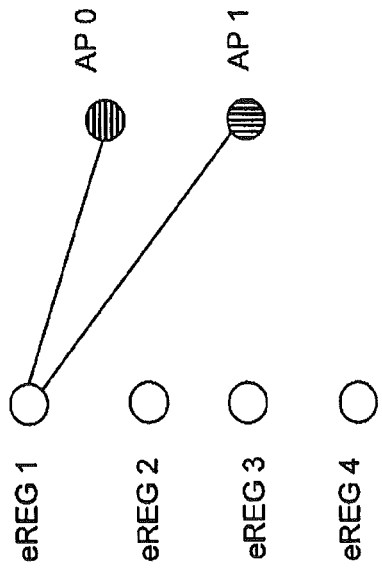
FIG. 14 is a schematic overview depicting another node diagram of associations between AP and eREGs.
Figure 12:
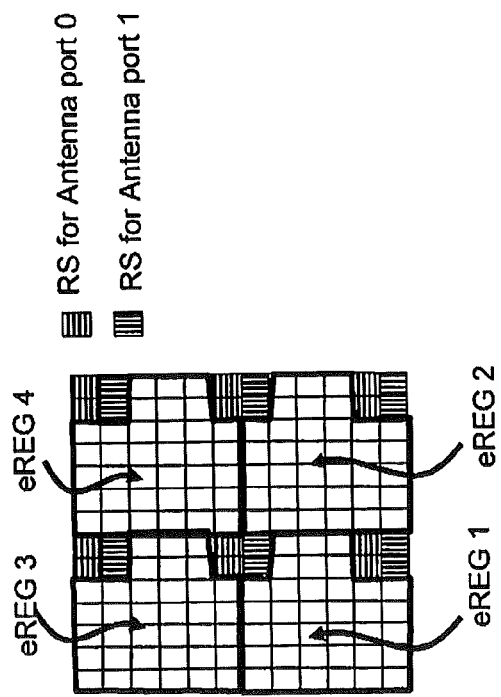
FIG. 12 is a schematic overview depicting a DL RB pair.

The figures are schematic and simplified for clarity, and they merely show details which are essential to the understanding of the embodiments, while other details have been left out. Throughout, the same reference numerals are used for identical or corresponding parts or steps.

As part of the developing the embodiments described herein, a problem will first be identified and discussed.

In some scenarios with favourable downlink channel conditions and/or with small DCI payloads, a large portion of the scheduled user equipments, for example, up to 90%, are scheduled PDCCH with a CCE aggregation level of 1, that is, AL=1. When scheduling these user equipments, the network node is thus constrained by the spectral efficiency of the PDCCH, which because of the use of QPSK-modulation is 2 bits/RE. It is therefore a problem how to provide an enhanced PDCCH with increased spectral efficiency.

It may also be seen as the spectral efficiency of the control channel has a limitation of AL=1 (2 bit/RE). This leads to unnecessary control overhead. With 8 eREG per RB, then 2 eREG share one AP. So, if ePDCCH use one eREG, then the other eREG associated with the AP is unused leading to resource waste.

It has also been observed that with non-full buffers and bursty traffic of data arriving at the network node, there is often only one user equipment scheduled in a given sub-frame. With the design of the ePDCCH as in the background art, a whole RB pair needs to be reserved for a control channel transmission to such a user equipment, which is inefficient since the ePDCCH in many cases does not need the whole RB pair for transmitting the control channel. Therefore, a problem is also how to efficiency use unused RE in the case of small aggregation levels and with a low number of scheduled user equipments in a sub-frame.

Figure 15:
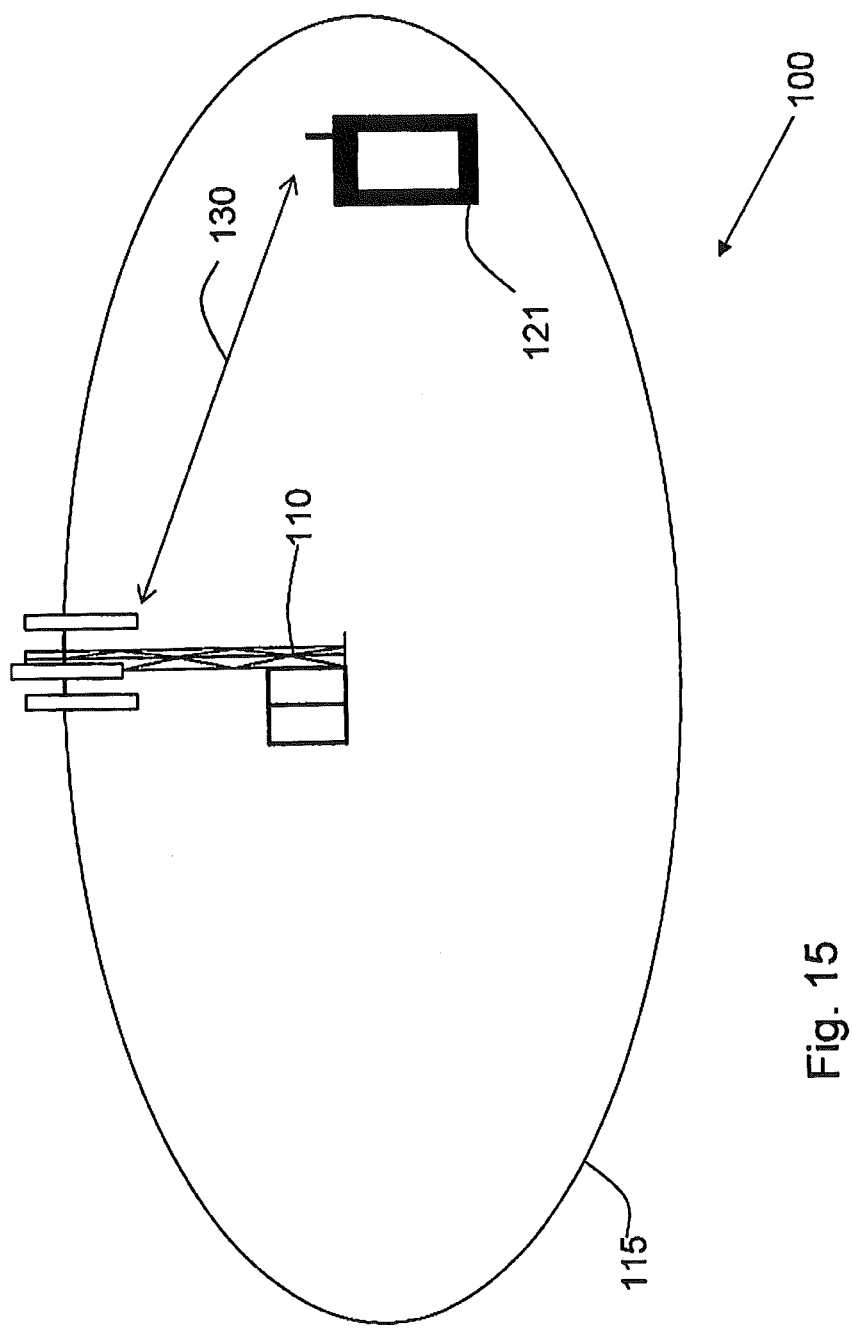
FIG. 15 is a schematic block diagram illustrating embodiments in a telecommunications system.

FIG. 15 depicts a telecommunications system 100 in which embodiments herein may be implemented. The cellular communications system 100 is a wireless communication network such as an LTE, WCDMA, GSM network, any 3GPP cellular network, or any cellular network or system.

The telecommunications system 100 comprises a base station which is a network node and is therefore referred to herein as the network node 110. The network node 110 serves a cell 115. The network node 110 may in this example e.g. be an eNB, eNodeB, or a Home Node B, a Home eNode B, femto Base Station (BS), pico BS or any other network unit capable to serve a user equipment or a machine type communication device in a telecommunications system.

A user equipment 121 is located within the cell 115. The user equipment 121 is configured to communicate within the telecommunications system 102 via the network node 110 over a radio link 130 when the user equipment 121 is present in the cell 115 served by the network node 110. Thereby, the user equipment 121 is capable of communicate with other user equipments located in the cell 115 and in other cells served by other network nodes. The user equipment 121 may, for example, be a mobile terminal or a wireless terminal, a mobile phone, a computer such as for example a laptop, a Personal Digital Assistant (PDA) or a tablet computer, sometimes referred to as a surf plate, with wireless capability, a device equipped with a wireless interface, such as a printer or a file storage device or any other radio network unit capable of communicating over a radio link in a telecommunications system.

Figure 16:
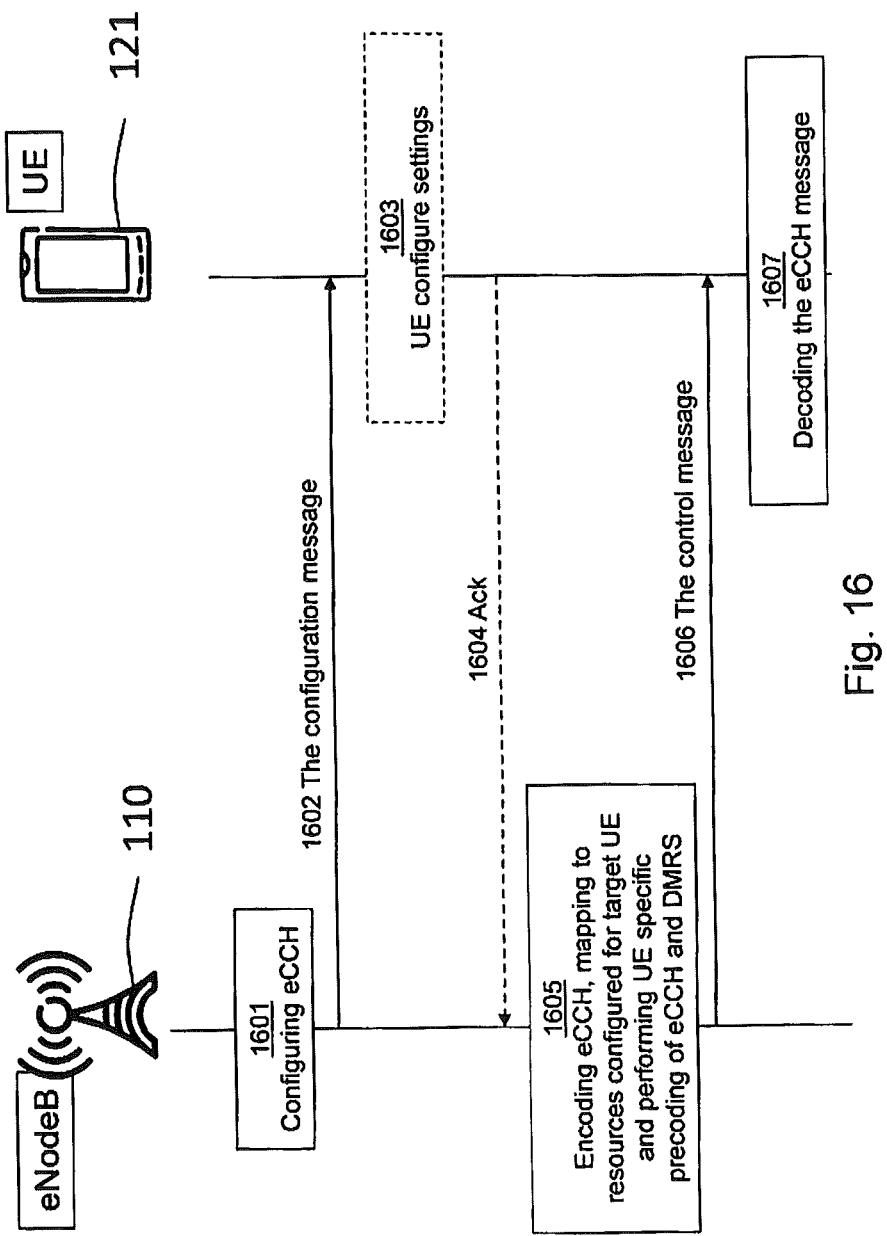
FIG. 16 is a signalling scheme depicting embodiments of a method in the telecommunications system.

Embodiments of a method in a telecommunications system will now be described with reference to the signalling scheme between the network node 110 and the user equipment 121 depicted in FIG. 16. The signalling scheme in FIG. 16 may comprise the following actions, and may be implemented for any of the below mentioned embodiments or in any combination with those.

Actions 1601

The network node 110 configures the eCCH configuration. This may be performed in order for the network node 110 to start using a CCE aggregation level for an eCCH that is smaller than the smallest CCE aggregation level of a PDCCH, and modulate the eCCH using a higher order modulation than QPSK-modulation, such that a lower amount of resources than what is used for a PDCCH is needed for transmitting the eCCH from the network node 110 to the user equipment 121. This is described in more detail in the actions below.

Action 1602

According to one embodiment, the network node 110 sends a configuration message to the user equipment 121 for configuring the user equipment 121 with the eCCH configuration. Alternatively, the user equipment 121 may already be provided with the eCCH configuration.

Action 1603

According to one embodiment, the user equipment 121 receives the configuration message from the network node 110 and configures its settings in accordance with the eCCH configuration. This may be performed in order for the user equipment 121 to be ready to receive and decode eCCH messages according to the eCCH configuration from the network node 110.

Action 1604

According to one embodiment, the user equipment 121 may send an Acknowledgment (ACK) to the network node 110 informing the network node 110 that the user equipment 121 has changed its setting, that is, the user equipment 121 is ready to receive and decode eCCH messages according to the eCCH configuration.

Action 1605

The network node 110 then starts to encode the eCCH and map the encoded eCCH to resources, that is, eREGs in RBs, configured for the target user equipment, such as, for example, the user equipment 121. Here, the eCCH may now comprise a CCE aggregation level that is smaller than the smallest CCE aggregation level of a PDCCH, and may be modulated with a higher order modulation than QPSK-modulation.

Also, the network node 110 performs UE-specific precoding of eCCH and demodulation RS (DMRS).

Action 1606

The network node 110 sends the mappings, that is, the eCCH, in control messages or as control messages to the user equipment 121.

Action 1607

The user equipment 121 receives and decodes the control messages, that is, eCCH messages. This may be performed according to the eCCH configuration for which the user equipment 121 has been configured.

Figure 17:
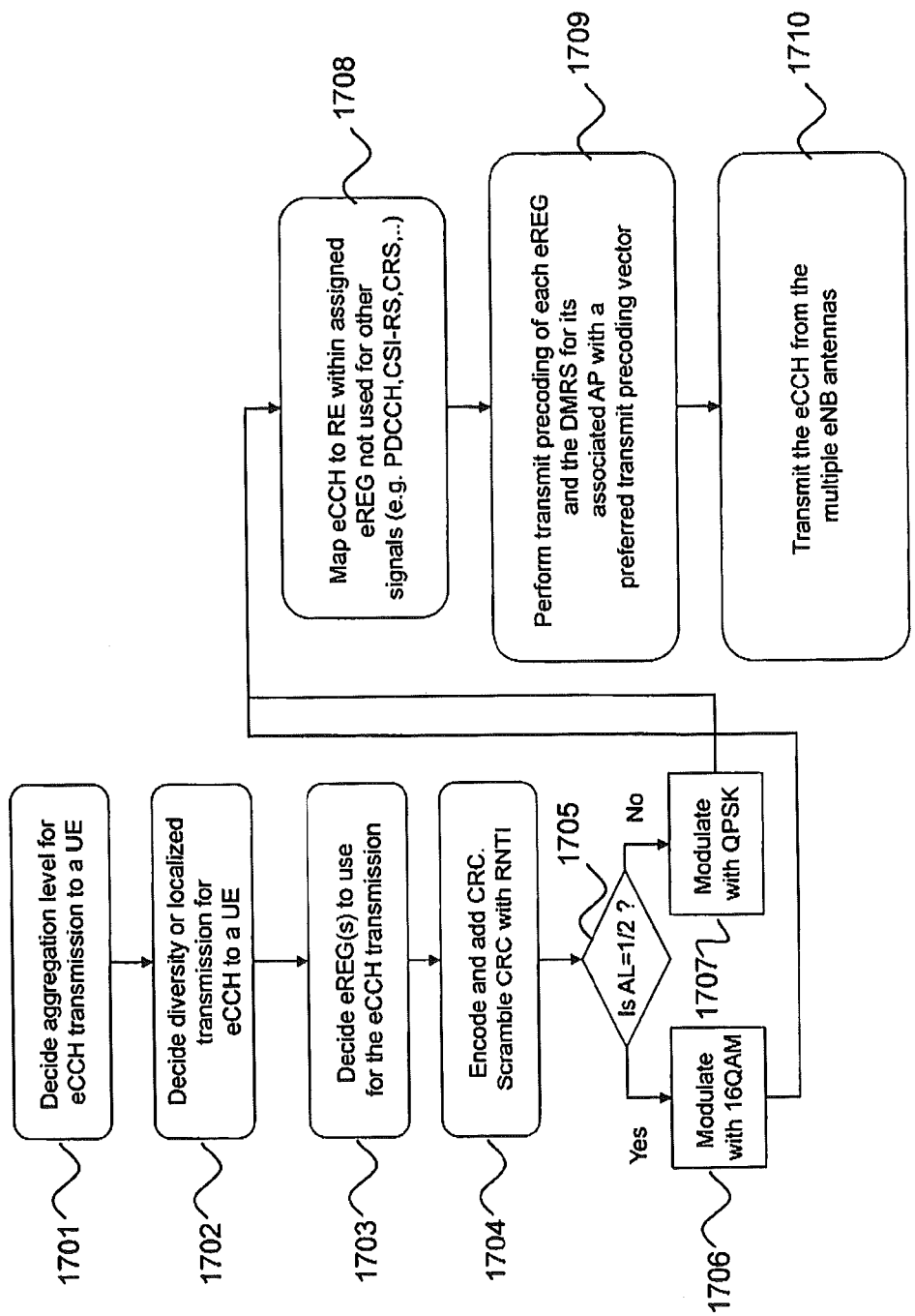
FIG. 17 is a flowchart depicting embodiments of a method in a network node.

Embodiments of a method in the network node 110 will now be described with reference to the flowchart depicted in FIG. 17. FIG. 17 is an illustrating example of a detailed flow chart for a procedure in the network node 110 to transmit an eCCH, for example, a ePDCCH, to the user equipment 121; in other words, a more detailed procedure as seen from the side of the network node 110 in the embodiment of the method shown in FIG. 16.

The flowchart in FIG. 17 describes the method in the network node 110 for transmitting the eCCH to the user equipment 121 in a telecommunications system 100. The eCCH comprises control information to the user equipment in at least one Control Channel Element, CCE. The at least one CCE maps to a number of resource elements, REs, comprised in at least one enhanced resource element group, eREG. The at least one enhanced resource element group, eREG, is comprised in at least one resource block, RB, in a time-frequency Orthogonal Frequency Division Multiplexing, OFDM, grid. Furthermore, the flowchart in FIG. 17 comprises the following actions, and may be implemented for any of the above and below mentioned embodiments or in any combination with those. The actions may be performed in any suitable order.

Action 1701

In this action, the network node 110 may decide an aggregation level for an eCCH transmission to the user equipment 121. The network node 110 may decide to use a CCE aggregation level that is smaller than the smallest CCE aggregation level of a physical downlink control channel, PDCCH, for the eCCH. This may, for example, be performed when there are favourable downlink channel conditions to the user equipment 121 and/or there are eCCH transmissions with small DCI payloads to be sent to the user equipment 121.

Action 1702

The network node 110 may decide diversity or localized transmission for the eCCH transmission to the user equipment 121.

Action 1703

The network node 110 may decide eREG(s) to use for the eCCH transmission. Conventionally, this decision may be constrained by the user equipment search space.

Action 1704

The network node 110 may encode and add CRC. Also, the network node 110 may scramble CRC with RNTI.

Action 1705

The network node 110 may determine if $AL=\frac{1}{2}$. That is, if the CCE aggregation level used for the eCCH transmission is smaller than the smallest CCE aggregation level of a physical downlink control channel, PDCCH, for the eCCH transmission, that is, $AL=1$. This may be performed by the network node 110 in order to select a suitable modulation, which may be used for modulating the eCCH transmission.

Action 1706

If $AL=\frac{1}{2}$, then the network node 110 may modulate the eCCH with 16 QAM. That is, the network node 110 modulates the eCCH by using a higher order modulation than Quadrature Phase Shift Keying, QPSK, modulation. This may be performed by the network node 110 in order to maintain the used code rate at a reasonably low level, when using a CCE aggregation level for the eCCH transmission that is smaller than the smallest CCE aggregation level of a physical downlink control channel, PDCCH.

Action 1707

If $AL \neq \frac{1}{2}$, then the network node 110 may modulate the eCCH with QPSK. That is, the network node 110 may modulate the eCCH by using Quadrature Phase Shift Keying, QPSK, modulation. This may, for example, be performed for a normal eCCH transmission comprising only the legacy CCE aggregation levels of a PDCCH, that is, $AL \geq 1$.

Action 1708

The network node 110 may map the eCCH to RE within assigned eREGs not used for other signals, such as, for example, PDCCH, CSI-RS, CRS. That is, the network node 110 may map the modulated eCCH to at least one enhanced resource element group of resource elements in at least one resource block.

Action 1709

The network node 110 may perform transmit precoding of each eREG and the DMRS for its associated AP with a preferred transmit precoding vector.

Action 1710

The network node 110 may transmit the mapped eCCH to the user equipment 121. This may be performed by the network node 110 by transmitting the eCCH from multiple network node antennas.

Figure 18:
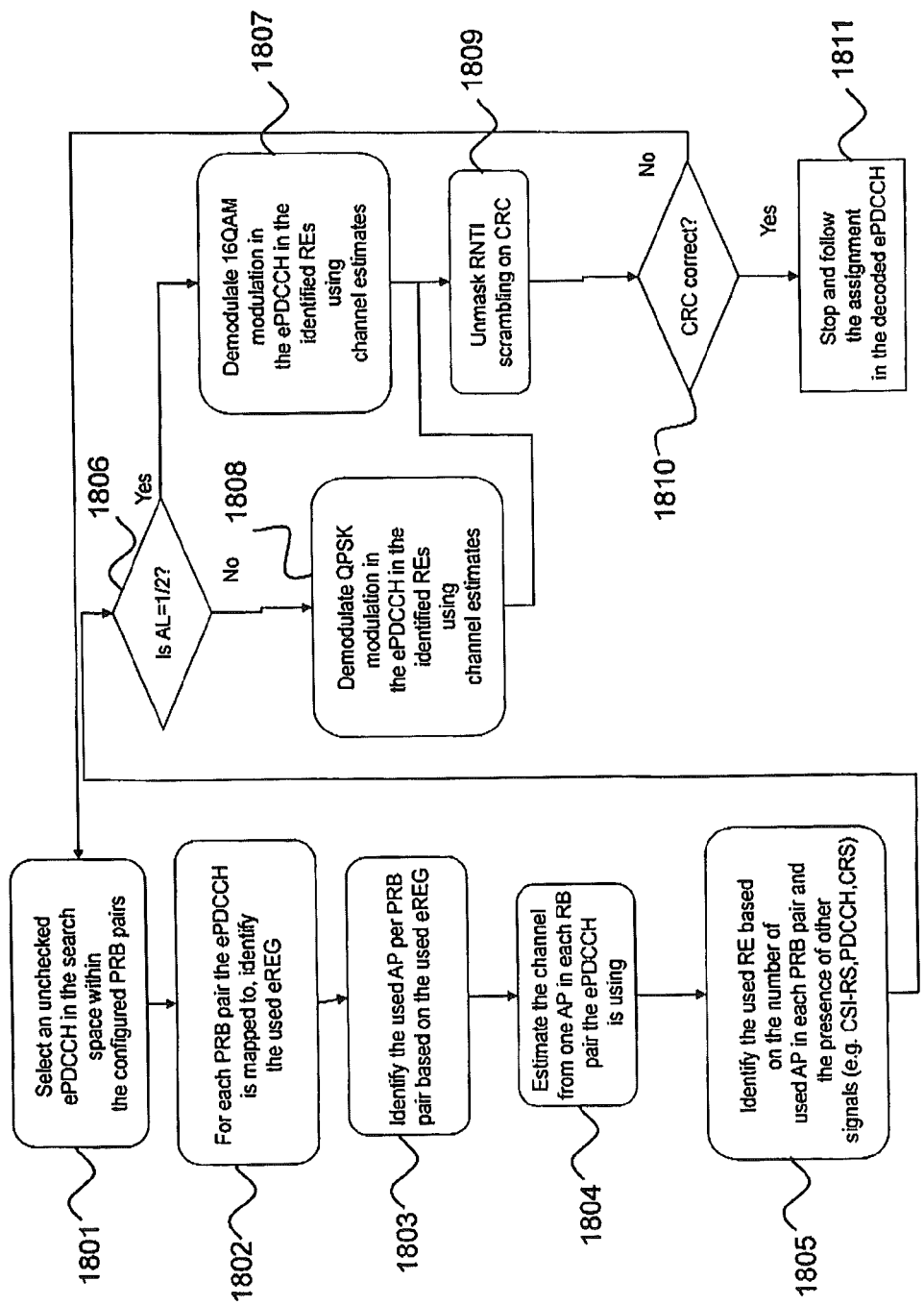
FIG. 18 is a flowchart depicting embodiments of a method in a user equipment.

Embodiments of a method in the user equipment 121 will now be described with reference to the flowchart depicted in FIG. 18. FIG. 18 is an illustrating example of a detailed flow chart for a procedure in the user equipment 121 to receive an eCCH, for example, a ePDCCH, from the network node 110; in other words, a more detailed procedure seen from the side of the user equipment 121 in the embodiment of the method shown in FIG. 16.

The flowchart in FIG. 18 describes the method in the user equipment 121 for handling the eCCH from the network node 110 in a telecommunications system 100. The eCCH comprises control information to the user equipment in at least one Control Channel Element, CCE. The at least one CCE maps to a number of resource elements, REs, comprised in at least one enhanced resource element group, eREG. The at least one enhanced resource element group, eREG, is comprised in at least one resource block in a time-frequency Orthogonal Frequency Division Multiplexing, OFDM, grid. Furthermore, the flowchart in FIG. 18 comprises the following actions, and may be implemented for any of the above and below mentioned embodiments or in any combination with those. The actions may be performed in any suitable order.

Action 1801

The user equipment 121 may select an unchecked eCCH, for example, a ePDCCH, in the search space within the configured RB pairs. Prior to this, the user equipment 121 will have received a eCCH, that is, a eCCH message, from the network node 110 as shown in Action 1607 above.

Action 1802

The user equipment 121 may for each RB pair that the eCCH, for example, a ePDCCH, is mapped to, identify the used eREG.

Action 1803

The user equipment 121 may identify the used AP per RB pair based on the used eREG.

Action 1804

The user equipment 121 may estimate the channel from one AP in each RB pair that the eCCH, for example, a ePDCCH, is using.

Action 1805

The user equipment 121 may also identify the used RE based on the number of used AP in each RB pair and the presence of other signals, such as, for example, DMRS, CSI-RS, PDCCH, CRS.

Action 1806

The user equipment 121 may determine if AL=½. This means that the user equipment determines whether a CCE aggregation level that is smaller than the smallest CCE aggregation level, that is, AL=1, of a physical downlink control channel, PDCCH, has been used for the eCCH, for example, a ePDCCH, or not.

Action 1807

If AL=½, the user equipment 121 may demodulate 16QAM modulation in the eCCH in the identified REs using channel estimates. This means that the user equipment 121 may demodulate the eCCH by using a higher order modulation than quadrature phase shift keying, QPSK, modulation, when the smaller CCE aggregation level has been used for the eCCH.

Action 1808

If AL≠½, the user equipment 121 may demodulate QPSK modulation in the eCCH in the identified REs using channel estimates. This means that the user equipment 121 may demodulate the eCCH by using Quadrature Phase Shift Keying, QPSK, modulation.

Action 1809

The user equipment 121 may unmask RNTI and scramble on CRC.

Action 1810

The user equipment 121 may further check if the CRC is correct.

Action 1811

In this action, the user equipment 121 stops and follows the assignment in the decoded eCCH, for example, a ePDCCH.

As may be seen above, according to some embodiments, an CCE aggregation level of an eCCH which is smaller than AL=1 is introduced, that is, a CCE aggregation level using fewer than 36 REs. This may, for example, be AL=½ or smaller, such as, for example, AL=⅓ or any other predetermined number that is less than 1. In order to not to reduce the number of encoded bits, the modulation constellation is at the same time increased. An example is using ½ CCE aggregation level with 16 QAM modulation. Higher order modulations, such as, for example, 64 QAM, may also be used.

Furthermore, this AL=½ CCE may be transmitted using one eREG and is thus associated with one AP. Additional eREG in this RB or RB pair may be associated with the same AP and may, for example, be used for a PDSCH transmission to the same user equipment 121 and/or another eCCH to the same user equipment 121 such as an additional ePDCCH transmission or an ePHICH transmission. This is described in more detail in some of the embodiments below.

Moreover, the number of blind decodes may be kept unchanged by introducing two sets of CCE aggregation levels, such as, {½, 1, 2, 4} and {1, 2, 4, 8}, so that the blind decodes of AL=8 and AL=½ are exclusively used, depending on the explicit or implicit configuration of the user equipment 121. This is also described in more detail in some of the embodiments below.

In some of the embodiments, it is assumed that 8 eREGs are created for each RB pair and that each eREG comprises up to 18 RE. The number of RE may depend on the presence of PDCCH, CRS, and CSI-RS. It is also assumed in some embodiments that one CCE may comprise up to 36 RE, which is the same as for LTE Rel. 8. It is also assumed that 1 CCE=2 eREGs. Further, it is also assumed that one ePDCCH or eCCH comprises at least one CCE which may either be localized or distributed over frequency. It is also assumed here that the use of antenna ports is different from previous use where an AP is associated with a MIMO layer, where herein the AP is associated with a region of REs. The regions are orthogonal in the time-frequency grid, hence only one layer is transmitted even though there are multiple AP in a RB pair. The number of APs may be fewer, same or larger than the number of physical antennas.

Figure 19:
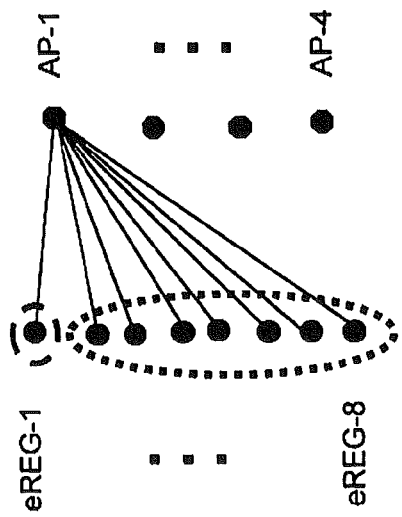
FIG. 19 is a schematic overview depicting associations between AP and eREGs in a node diagram according to some embodiments of the methods, the network node and user equipment.

FIG. 19 is a schematic overview depicting associations between AP and eREGs in a node diagram according to some embodiments of the methods, the network node 110 and user equipment 121 herein.

In these embodiments, one of the eREG within the RB or RB pair is used for transmitting an eCCH of AL<1 and 16QAM modulation constellation. The remaining eREGs may be used to transmit PDSCH using the same AP, that is, pre-coded with the same precoding vector. Thus, the network node 110 may transmit a PDSCH to one or more user equipments 121, 122 using the same first antenna port, AP-1, and by using the remaining enhanced resource element groups, that is, eREG-2, . . . , eREG-8, in at least one resource block.

This has the advantage of using a very low control overhead when transmitting the DL control assignment to the user equipment 121. It also provides a full utilization of the remaining eREGs for the single layer PDSCH transmission. In one preferred embodiment, the ePDCCH and the PDSCH in the RB pair is intended to the same user equipment 121; that is, the eCCH and the PDSCH in at least one resource block are intended for the user equipment 121.

To exemplify the low control overhead that is possible with this arrangement, consider a scheduling bandwidth of x number of RBs. One of these x number of RB comprises one eREG with the eCCH carrying the DL assignment and the remaining eREG carrying PDSCH transmissions. Then, the control overhead is $\frac{1}{8}*x$, which may be as low as $\frac{1}{800}$ for very large scheduling bandwidths, such as, for example, for x=100. This should be compared with the minimum control overhead for PDCCH which is $\frac{1}{14}$, even if only one user equipment 121 is scheduled in the whole bandwidth.

Figure 20:
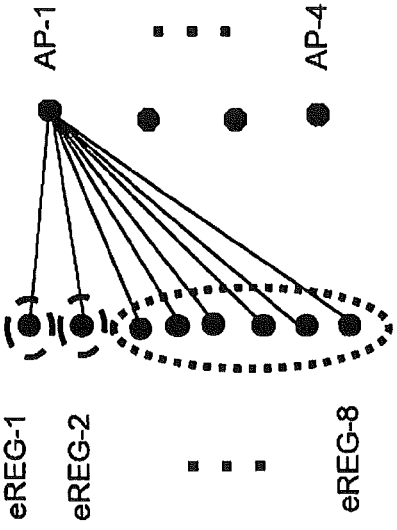
FIG. 20 is a schematic overview depicting associations between AP and eREGs in a node diagram according to some embodiments of the methods, the network node and user equipment.

FIG. 20 is a schematic overview depicting associations between AP and eREGs in a node diagram according to some embodiments of the methods, the network node 110 and user equipment 121. In FIG. 20, the two first eREG comprises enhanced PDCCH transmissions.

In these embodiments, two of the eREGs within the RB or RB pair are used for transmitting two different eCCHs, each using AL<$\frac{1}{2}$ and 16QAM modulation and both using the same AP. The remaining eREGs may be used to transmit PDSCH using the same AP, i.e. pre-coded with the same precoding vector. These may thus be intended to one and the same user equipment 121. Hence, the network node 110 may transmit at least one second eCCH to one or more user equipments 121, 122 using the same first antenna port AP-1 and by using at least one of the remaining enhanced resource element groups eREG-2, . . . , eREG-8 in at least one resource block, in which the at least one second eCCH is modulated using a higher order modulation than QPSK-modulation and has a CCE aggregation level that is smaller than the smallest CCE aggregation level of a PDCCH.

This has the advantage of using a very low control overhead when transmitting the DL control assignment to the user equipment 121. This also applies to the UL grant or alternatively another control channel, such as, an enhanced PHICH to the user equipment 121. It also provides a full utilization of the remaining eREGs for a single layer PDSCH transmission to the same user equipment 121.

In one example, these two eREGs carries a downlink assignment and an uplink grant respectively; that is, one of the enhanced resource element groups eREG-1 of the eCCH, or one of the remaining enhanced resource element groups eREG-2, eREG-8 of the at least one second eCCH carries a downlink assignment or an uplink grant.

Furthermore, the network node 110 may thus transmit a PDSCH to one or more user equipments 121, 122 using the same first antenna port AP-1 and by using any remaining enhanced resource element groups eREG-2; . . . ; eREG-8 in at least one resource block.

Figure 21:
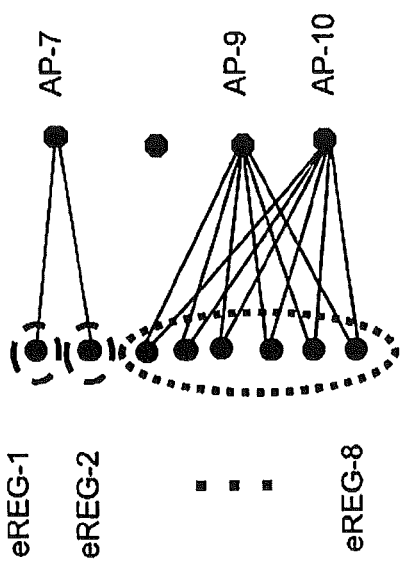
FIG. 21 is a schematic overview depicting associations between AP and eREGs in a node diagram according to some embodiments of the methods, the network node and user equipment.

FIG. 21 is a schematic overview depicting associations between AP and eREGs in a node diagram according to some embodiments of the methods, the network node 110 and the user equipment 121 herein.

In this embodiment, some of the eREGs are used for enhanced PDCCH transmission with AL<1 and 16QAM modulation constellation. The remaining eREGs are used for a PDSCH transmission with multiple layers. In this case, more than one antenna port is used for the PDSCH transmission. To keep the selection of precoding matrices/vectors independent between the PDSCH transmission and the enhanced PDCCH transmission, the used antenna ports are separate for the two channels. Thus, the network node 110 may transmit a PDSCH with multiple layers using the remaining enhanced resource element groups eREG-2; . . . ; eREG-8 in the at least one resource block.

Furthermore, to allow for a more flexible power boosting of the enhanced PDCCH, the used AP is time-frequency multiplexed, and not code multiplexed with the APs used for the multi-layer PDSCH transmission.

In FIG. 21, the first eREG comprises enhanced PDCCH transmissions. The remaining eREG may comprise 2 layer MIMO transmission of PDSCH. The enhanced PDCCH is mapped to DMRS antenna port 7 and the PDSCH layers are mapped to DMRS antenna ports 9 and 10, respectively. This means that the AP for these two channel types have time-frequency multiplexed reference symbols. This gives more flexibility for the power boosting. Furthermore, eREG-2 is not used for the PDSCH transmission since it is tied to AP-8. It may however be used for an additional enhanced PDCCH with AL<1.

According to some embodiments, the number of blind decodes may be controlled, or is kept constant when introducing AL<1 and 16QAM modulation. This is achieved by defining at least two UE-specific search spaces where at least one of them include the AL<1 enhanced PDCCH with 16QAM modulation and at least one of them do not include AL<1, that is, only comprises the legacy AL 1, 2, 4 and 8.

Thus, the network node 110 may send a configuration message to the user equipment 121 to configure its settings to use a set of search spaces that are specific for the user equipment 121. The set of search spaces may comprise a search space at a CCE aggregation level that is smaller than the smallest CCE aggregation level of a PDCCH.

Hence, the user equipment 121 may receive the configuration message from the network node 110 to configure its settings to use a set of search spaces that are specific for the user equipment 121. The set of search spaces may comprise a search space at a CCE aggregation level that is smaller than the smallest CCE aggregation level of a PDCCH.

Furthermore, the user equipment 121 thus may use the set of search spaces that are specific for the user equipment 121, which comprise a search space at an CCE aggregation level that is smaller than the smallest CCE aggregation level of a PDCCH for the eCCH, when it has been determined that a CCE aggregation level that is smaller than the smallest CCE aggregation level of a PDCCH has been used for the eCCH.

The configuration of the user equipment 121 as to which of these multiple search spaces to use may be performed by, for example, RRC signalling from the network node 110. Alternatively, it may be tied to the hypothesis of the DCI format which the user equipment 121 may assume when performing the blind decoding. Thus, the user equipment 121 may determine whether a CCE aggregation level that is smaller than the smallest CCE aggregation level of a PDCCH has been used for the eCCH or not, based on the DCI-format of the control information in the eCCH, or based on whether the at least one enhanced resource element group eREG-1 associated with the eCCH belongs to a distributed or localized transmission of the eCCH.

In a further embodiment, there are two set of search spaces defined, where one comprises AL={1, 2, 4, 8} and the other AL={1½, 1, 2, 4}. The user equipment 121 may use one of them depending on, for example, explicit signalling from the network node, e.g. by RRC signalling, or by implicit rules, such as, e.g. DCI format or whether the eREG belongs to a distributed or localized enhanced PDCCH transmission. Here, the number of blind decodes of AL=8 may be exchanged for blind decodes of AL=½ and the total number is kept constant. Accordingly, the user equipment 121 may thus use a set of search spaces that are specific for the user equipment 121 which do not comprise a search space at an CCE aggregation level that is smaller than the smallest CCE aggregation level of a PDCCH for the eCCH, when it has been determined that a CCE aggregation level that is smaller than the smallest CCE aggregation level of a PDCCH has not been used for the eCCH.

According to at least some of the above embodiments there is provided methods and apparatuses/devices/nodes for increasing/improving the spectral efficiency above 2 bits/RE. The embodiments herein may be categorized into using multi-layer transmission or using higher order modulation. The multi-layer eCCH may further be divided into the case where the user equipment 121, that is, a single UE (SU) receives multiple layers, that is, SU-MIMO, or where each of the multiple-layers is transmitted to different user equipments 121, that is, multiple UEs (MU), referred to as MU-MIMO.

Supporting MU-MIMO operation with non-orthogonal DMRS is natural for shared cell scenarios, such as, the CoMP scenario 4. This is done to provide area splitting gains of the eCCH; the same resource is used multiple times in the same cell. In a shared cell scenario, the same physical resources can be used in different transmission points within a cell or belonging to different cells that are not highly interfering with each other. An example is when a macro cell contains low power pico nodes or remote radio heads (RRH) within its coverage area. The low power pico nodes or remote radio heads (RRH) having, or being associated to, the same synchronization signal/cell ID. In this manner, the total control channel capacity in the shared cell may increase, since a given RB resource is re-used, potentially multiple times, in different parts of the cell.

An agreed working assumption (WA) at meeting #66bis allows the DMRS sequences to be semi-statically configured in a UE-specific manner and if the same DMRS are used for the eCCH, then this WA naturally applies also to the eCCH.

Supporting MU-MIMO operation with orthogonal DMRS needs more considerations. This is because it requires one antenna port per user equipment in the RB pair that is used for transmitting the eCCH and there may then be issues with increased number of blind decoding; this in order to still have the flexibility to pair any two user equipments 121 at a given sub-frame.

According to at least one embodiment, MU-MIMO for the eCCH with non-orthogonal reference signals may be supported to provide the spatial reuse of the resources, targeting the shared cell scenario with shared cell ID together with RRH.

SU-MIMO transmission of a DCI to a user equipment 121 would with 2 layer transmission double the achievable peak spectral efficiency to 4 bits/RE. However, this comes at the cost of requiring more advanced MIMO receivers and at least two receiving antennas. In PDSCH transmissions, SU-MIMO may provide very high spectral efficiencies at high SINR, exceeding the peak provided by the highest modulation order (64QAM) of a single layer.

Since PDCCH and R-PDCCH currently supports QPSK modulation, the spectral efficiency may be doubled by introducing 16QAM, and still low complexity single layer receivers may be used.

According to at least one embodiment, SU-MIMO may not be supported for the eCCH. Using higher order modulation, for example, 16QAM, to double the spectral efficiency should be further considered.

For small DCI payloads in favourable geometries there is also a possibility to introduce a new aggregation level of ½ CCE to allow a DCI to be transmitted in only half of the resources used for a PDCCH transmission. This is particularly attractive in combination with 16QAM modulation to keep the used code rate reasonable low. Introducing this have an impact on the search space and the number of blind decoding which may be further considered.

According to at least one embodiment, the introduction of aggregation level ½ CCE for the eCCH is considered.

Note also that when referring to an enhanced/extend control channel, for example, eCCH, in any of the above embodiments, this may be any control channel that is frequency multiplexed with data and has self-contained reference signals for demodulation within the block of resources occupied by the control information.

In alternative embodiments or according to any of the embodiments mentioned above, the possibility to use only one RB instead of a RB pair for the control transmission is given. It may also be so that a eREG used for a certain eCCH transmission may be mapped only to one of the two RB in a RB pair.

Figures 22, 23:
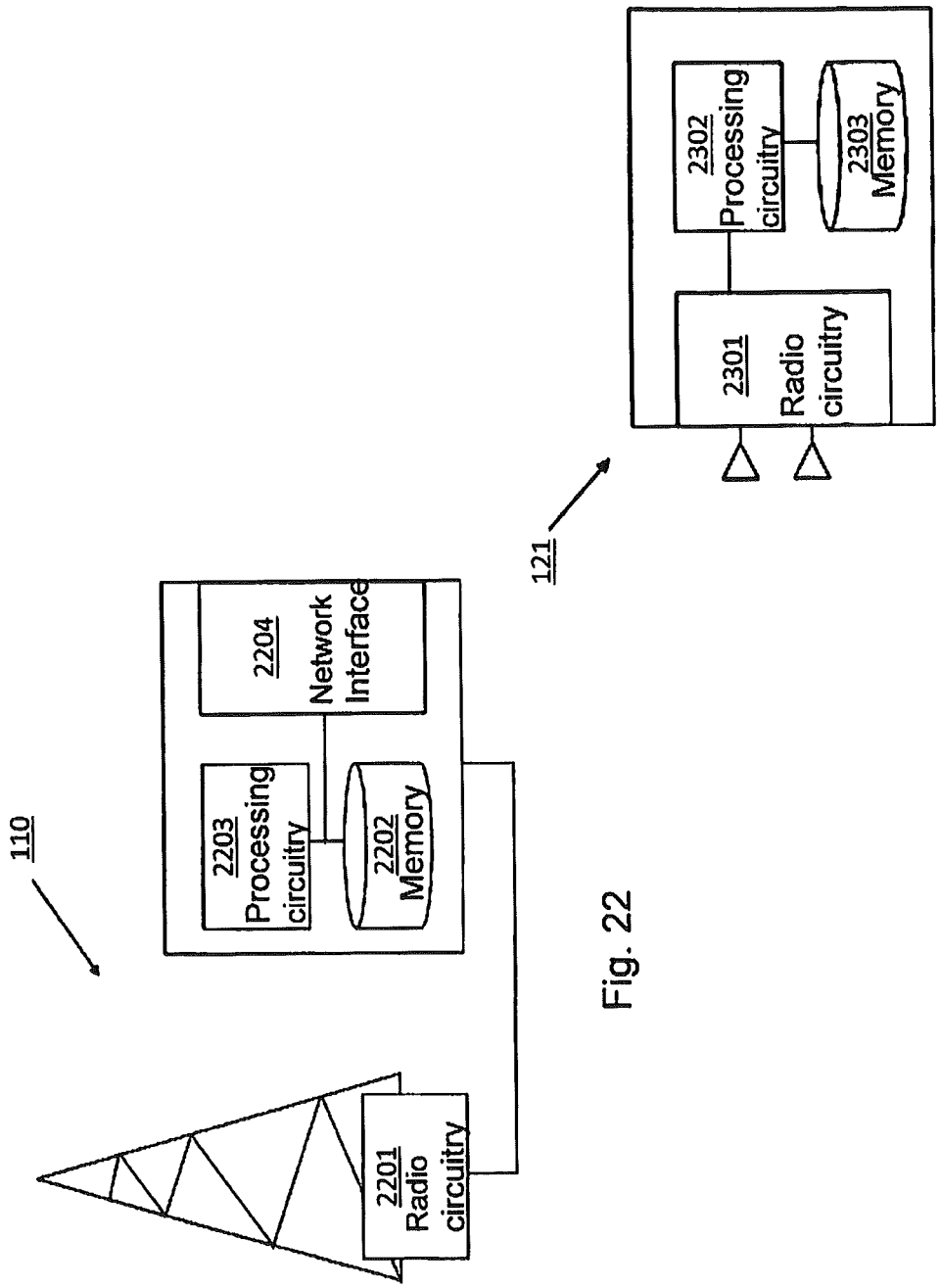
FIG. 22 is a schematic block diagram of embodiments of a network node.
FIG. 23 is a schematic block diagram of embodiments of a user equipment.

FIG. 22 shows a schematic block diagram of embodiments of the network node 110, and FIG. 23 shows a schematic block diagram of embodiments of the user equipment 121.

Although the described embodiments above may be implemented in any appropriate type of telecommunication system supporting any suitable communication standards and using any suitable components, particular embodiments of the described solutions may be implemented in an LTE network, the example network may include one or more instances of wireless devices 121, e.g. mobile terminals, laptops, M2M-capable devices, or home base station, and one or more network nodes capable of communicating with these wireless devices, where examples of network nodes include eNBs 110, home base stations 110, positioning node (eSMLC), MME, SON node, and Gateway. Thus, some network nodes such as home base stations 110, 121 may in some scenarios be considered as wireless devices within the context of this disclosure. This is in particular true for small network devices where the form factor may significantly affect radio performance.

The example network may further include any additional elements suitable to support communication between wireless devices or between a wireless device and another communication device (such as a landline telephone). Although the illustrated wireless devices may represent communication devices that include any suitable combination of hardware and/or software, these wireless devices may, in particular embodiments, represent devices such as the example wireless device 121 illustrated in greater detail by FIG. 22. Similarly, although the illustrated network nodes may represent network nodes that include any suitable combination of hardware and/or software, these network nodes may, in particular embodiments, represent devices such as the example network node 110 illustrated in greater detail by FIG. 21.

As shown in FIG. 22, the example wireless device 121 includes processing circuitry 2203, a memory 2202, radio circuitry 2201, and at least one antenna. The radio circuitry may comprise RF circuitry and baseband processing circuitry (not shown). In particular embodiments, some or all of the functionality described above as being provided by mobile communication devices or other forms of wireless device may be provided by the processing circuitry 2203 executing instructions stored on a computer-readable medium, such as the memory 2202 shown in FIG. 22. Alternative embodiments of the wireless device 121 may include additional components beyond those shown in FIG. 22 that may be responsible for providing certain aspects of the wireless device's functionality, including any of the functionality described above and/or any functionality necessary to support the solution described above.

It should also be noted that it is an important advantage of some embodiments herein that they enable a scheduling with very low control overhead. Also, it is an important advantage of some embodiments herein that they are able to schedule an eCCH comprising a downlink assignment together with the scheduled PDSCH transmission, within the same RB. Further, it is an important advantage of some embodiments herein that they are able to maintain the number of blind decodes constant although a new aggregation link is introduced.

ABBREVIATIONS

AL Aggregation level
AP Antenna port
CCE Control Channel Element
CDM Code-Division Multiplexing
CRS Common Reference Symbols
DCI Downlink Control Information
DL Downlink
DMRS Demodulation Reference Symbols
eCCH enhanced Control CHannel
eNB enhanced Node B
ePDCCH enhanced Physical Downlink Control CHannel
eREG enhanced Resource Element Group
eSMLC enhanced Serving Mobile Location Center
FDM Frequency-Division Multiplexing
MIMO Multiple-Input Multiple-Output
MME Mobility Management Entity
MU-MIMO Multiple UEs-MIMO
M2M Machine-to-machine
PBCH Physical Broadcast CHannel
PDCCH Physical Downlink Control CHannel
PDSCH Physical Downlink Shared CHannel
PHICH Physical HARQ indicator CHannel
RB or PRB Resource block
RE Resource Element
RN Relay Node
R-PDCCH Relay-Physical Downlink Control CHannel
RRH Remote Radio Head
RS Reference Signal
SINR Signal-to-Noise Ratio
SON Self-Organising Network
SU-MIMO Single UEs-MIMO
TDM Time-Division Multiplexing
UE User Equipment
UL Uplink
QAM Quadrature Amplitude Modulation
QPSK Quadrature Phase Shift Keying When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be construed as limiting.

The invention claimed is:

1. A method in a network node for transmitting an enhanced Control CHannel (eCCH) to a user equipment in a telecommunications system, wherein the eCCH comprises control information to the user equipment, in at least one Control Channel Element (CCE), which at least one CCE maps to a number of resource elements comprised in at least one enhanced resource element group, which at least one enhanced resource element group is comprised in at least one resource block in a time-frequency Orthogonal Frequency Division Multiplexing (OFDM) grid, the method comprising:
    modulating a first eCCH by using a higher order modulation than Quadrature Phase Shift Keying (QPSK) modulation, in response to a CCE aggregation level that is smaller than the smallest CCE aggregation level of a Physical Downlink Control CHannel (PDCCH) is used for the first eCCH;
    mapping the modulated first eCCH to the at least one enhanced resource element group of resource elements in the at least one resource block; and
    transmitting the mapped first eCCH to the user equipment.

2. The method according to claim 1, further comprising:
    sending a configuration message to the user equipment to configure its settings to use a set of search spaces that are specific for the user equipment which comprises a search space at an CCE aggregation level that is smaller than the smallest CCE aggregation level of a PDCCH.

3. The method according to claim 2, further comprising:
    transmitting a Physical Downlink Shared Data CHannel (PDSCH) to one or more user equipments using a same first antenna port and by using the remaining enhanced resource element groups in the at least one resource block.

4. The method according to claim 3, wherein the first eCCH and the PDSCH in the at least one resource block are intended for the user equipment.

5. The method according to claim 1, further comprising:
    transmitting at least one second eCCH to one or more user equipments using the same first antenna port and by using at least one of the remaining enhanced resource element groups in the at least one resource block,
    in which the at least one second eCCH is modulated using a higher order modulation than QPSK-modulation and has a CCE aggregation level that is smaller than the smallest CCE aggregation level of a PDCCH.

6. The method according to claim 5, wherein one of the enhanced resource element groups of the first eCCH, or wherein one of the remaining enhanced resource element groups of the at least one second eCCH carries a downlink assignment or an uplink grant.

7. The method according to claim 6, further comprising:
    transmitting a PDSCH to one or more user equipments using the same first antenna port and by using any remaining enhanced resource element groups in the at least one resource block.

8. The method according to claim 1, further comprising:
    transmitting a PDSCH with multiple layers using the remaining enhanced resource element groups in the at least one resource block.

9. A network node for transmitting an enhanced control CHannel (eCCH) to a user equipment in a telecommunications system, wherein the eCCH comprises control information to the user equipment, in at least one Control Channel Element (CCE), which at least one CCE maps to a number of resource elements comprised in at least one enhanced resource element group, which at least one enhanced resource element group is comprised in at least one resource block in a time-frequency Orthogonal Frequency Division Multiplexing (OFDM) grid, the network node comprising:
a processing circuitry configured to modulate a first eCCH by using a higher order modulation than Quadrature Phase Shift Keying (QPSK) modulation when in response to a CCE aggregation level that is smaller than the smallest CCE aggregation level of a physical downlink control channel, PDCCH, is used for the first eCCH, map the modulated first eCCH to the at least one enhanced resource element group of resource elements in the at least one resource block, and transmit the mapped first eCCH to the user equipment.

10. The network node according to claim 9, wherein the processing circuitry is further configured to send a configuration message to the user equipment to configure its settings to use a set of search spaces that are specific for the user equipment which comprises a search space at an CCE aggregation level that is smaller than the smallest CCE aggregation level of a PDCCH.

11. The network node according to claim 10, wherein the processing circuitry is further configured to transmit a Physical Downlink Shared Data CHannel (PDSCH) to one or more user equipments using the same first antenna port and by using the remaining enhanced resource element groups in the at least one resource block.

12. The network node according to claim 11, wherein the first eCCH and the PDSCH in the at least one resource block are intended for the user equipment.

13. The network node according to claim 9, wherein the processing circuitry is further configured to transmit at least one second eCCH to one or more user equipments using the same first antenna port and by using at least one of the remaining enhanced resource element groups in the at least one resource block, in which the at least one second eCCH is modulated using a higher order modulation than QPSK-modulation and has a CCE aggregation level that is smaller than the smallest CCE aggregation level of a PDCCH.

14. The network node according to claim 13, wherein one of the enhanced resource element groups of the first eCCH, or wherein one of the remaining enhanced resource element groups of the at least one second eCCH carries a downlink assignment or an uplink grant.

15. The network node according to claim 14, wherein the processing circuitry is further configured to transmit a PDSCH to one or more user equipments using the same first antenna port and by using any remaining enhanced resource element groups in the at least one resource block.

16. The network node according to claim 9, wherein the processing circuitry is further configured to transmit a PDSCH with multiple layers by using the remaining enhanced resource element groups in the at least one resource block.

17. A method in a user equipment for handling an enhanced control CHannel (eCCH) from a network node in a telecommunications system, wherein the eCCH comprises control information to the user equipment in at least one Control Channel Element (CCE), which at least one CCE maps to a number of resource elements comprised in at least one enhanced resource element group, which at least one enhanced resource element group is comprised in at least one resource block in a time-frequency Orthogonal Frequency Division Multiplexing (OFDM) grid, the method comprising:
determining whether a CCE aggregation level that is smaller than the smallest CCE aggregation level of a physical downlink control channel, PDCCH, has been used for a first eCCH or not; and
demodulating the first eCCH by using a higher order modulation than Quadrature Phase Shift Keying (QPSK) modulation, in response to the smaller CCE aggregation level has been used for the first eCCH.

18. The method according to claim 17, wherein the determining is based on the DCI-format of the control information in the first eCCH, or based on whether the at least one enhanced resource element group associated with the first eCCH belongs to a distributed or localized transmission of the first eCCH.

19. The method according to claim 18, further comprising:
using a set of search spaces that are specific for the user equipment which comprise a search space at an CCE aggregation level that is smaller than the smallest CCE aggregation level of a PDCCH for the first eCCH, in response to determining that a CCE aggregation level that is smaller than the smallest CCE aggregation level of a PDCCH has been used for the first eCCH.

20. The method according to claim 17, further comprising:
using a set of search spaces that are specific for the user equipment which do not comprise a search space at an CCE aggregation level that is smaller than the smallest CCE aggregation level of a PDCCH for the first eCCH, in response to determining that a CCE aggregation level that is smaller than the smallest CCE aggregation level of a PDCCH has not been used for the first eCCH.

21. The method according to claim 17, further comprising:
receiving a configuration message from a network node to configure its settings to use a set of search spaces that are specific for the user equipment which comprises a search space at an CCE aggregation level that is smaller than the smallest CCE aggregation level of a PDCCH.

22. A user equipment for handling an enhanced control CHannel (eCCH) from a network node in a telecommunications system, wherein the eCCH comprises control information to the user equipment, in at least one Control Channel Element (CCE), which at least one CCE maps to a number of resource elements comprised in at least one enhanced resource element group, which at least one enhanced resource element group is comprised in at least one resource block in a time-frequency Orthogonal Frequency Division Multiplexing (OFDM) grid, the user equipment comprising:
a processing circuitry configured to determine whether a CCE aggregation level that is smaller than the smallest CCE aggregation level of a physical downlink control channel, PDCCH, has been used for a first eCCH or not, and demodulate the first eCCH by using a higher order modulation than Quadrature Phase Shift Keying (QPSK) modulation, in response to determining that the smaller CCE aggregation level has been used for the received first eCCH.

23. The user equipment according to claim 22, wherein the processing circuitry is further configured to perform the determination based on the DCI-format of the control information in the first eCCH, or based on whether the at least one enhanced resource element group associated with the first eCCH belongs to a distributed or localized transmission of the first eCCH.

24. The user equipment according to claim 23, wherein the processing circuitry is further configured to use a set of search spaces that are specific for the user equipment which comprise a search space at an CCE aggregation level that is smaller than the smallest CCE aggregation level of a PDCCH for the first eCCH, in response to determining that a CCE aggregation level that is smaller than the smallest CCE aggregation level of a PDCCH has been used for the first eCCH.

25. The user equipment according to claim 22, wherein the processing circuitry is further configured to use a set of search spaces that are specific for the user equipment which do not comprise a search space at an CCE aggregation level that is smaller than the smallest CCE aggregation level of a PDCCH for the first eCCH, in response to determining that a CCE aggregation level that is smaller than the smallest CCE aggregation level of a PDCCH has not been used for the first eCCH.

26. The user equipment according to claim 22, wherein the processing circuitry is further configured to receive a configuration message from a network node to configure its settings to use a set of search spaces that are specific for the user equipment which comprises a search space at an CCE aggregation level that is smaller than the smallest CCE aggregation level of a PDCCH.

* * * * *